United States Patent [19]

Keilholz

[11] E Re. 30,640

[45] Reissued Jun. 9, 1981

[54] VEHICLE LIFTING JACK

[75] Inventor: Friedrich Keilholz, Ennepetal, Fed. Rep. of Germany

[73] Assignee: Firma August Bilstein, Ennepetal, Fed. Rep. of Germany

[21] Appl. No.: 968,848

[22] Filed: Dec. 12, 1978

Related U.S. Patent Documents

Reissue of:

[64] Patent No.: 3,989,225
Issued: Nov. 2, 1976
Appl. No.: 584,419
Filed: Jun. 6, 1975

[30] Foreign Application Priority Data

Jun. 7, 1974 [DE] Fed. Rep. of Germany ..... 2427443
Aug. 12, 1974 [DE] Fed. Rep. of Germany ..... 2438643
Mar. 10, 1975 [DE] Fed. Rep. of Germany ... 7504739[U]

[51] Int. Cl.[3] ..... B66F 3/12
[52] U.S. Cl. ..... 254/126
[58] Field of Search ..... 254/126, 124, 101, 100

[56] References Cited

U.S. PATENT DOCUMENTS 1,714,464 5/1929 Merriman ..... 254/126

FOREIGN PATENT DOCUMENTS

P3075 7/1953 Fed. Rep. of Germany .
1481211 4/1973 Fed. Rep. of Germany .
7336408 4/1974 Fed. Rep. of Germany .
1778036 1/1980 Fed. Rep. of Germany .
711061 9/1931 France ..... 254/126
1378706 1/1964 France ..... 254/126

*Primary Examiner*—Robert C. Watson
*Attorney, Agent, or Firm*—Karl F. Ross

[57] ABSTRACT

A shear-type vehicle jack has an arm articulated to a leg whose foot is provided with a rolling formation adapted to rest upon the ground and a larger locating portion. A crank rotates a thread spindle in a nut pivotally received in the upper end of the leg and engaging the arm with a bearing arrangement. The free end of the arm has carrying formations adapted to engage the vehicle chassis in a manner free from bending moments.

6 Claims, 19 Drawing Figures

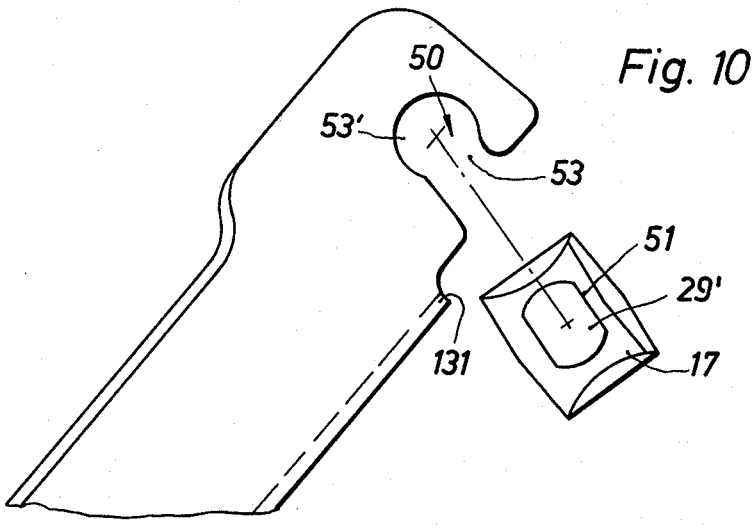
Fig. 10
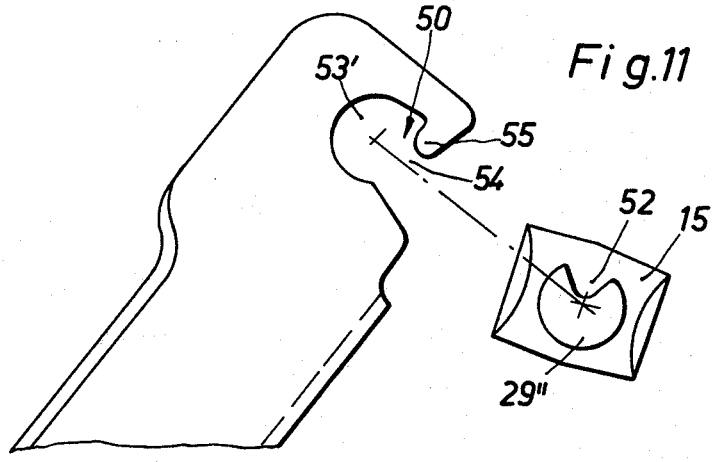
Fig.11
Fig.11a
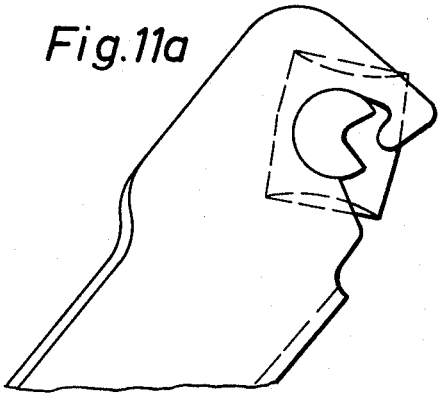
Fig.11b
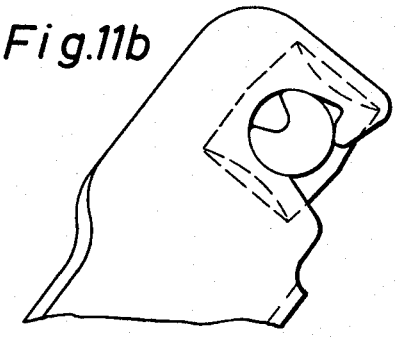

VEHICLE LIFTING JACK

Matter enclosed in heavy brackets [ ] appears in the original patent but forms no part of this reissue specification; matter printed in italics indicates the additions made by reissue.

FIELD OF THE INVENTION

The invention relates to a vehicle-lifting jack with a supporting leg including a foot member, a carrier arm pivotally movable on the leg about a vertically non-adjustable horizontal axis. The arm, at its free end, has a load-supporting head engaging a vehicle chassis and which is pivotally adjustable by means of a manual operating mechanism (in particular a threaded spindle) pivotally engaging the arm between the load head and the pivot axis and linked to the upper end of the supporting leg.

BACKGROUND OF THE INVENTION

A known shears-like vehicle jack of this kind has a foot plate as the foot member, which is mounted upon the leg by a hinge. For safer support of the jack, the foot plate should always rest flat upon the ground. Because of the hinge joint, the necessarily inclined position of the leg on installation is not always well defined, so that with an improperly inclined position, slipping of the jack can occur on lifting.

Known spindle jacks with rigid carrier arms have a roller foot mounted on the leg. Apart from its support surface, this has a contact surface provided at an angle, with which the desired inclined position of the leg can be determined on installation of the jack under the vehicle. It has already been shown that slipping of even this jack can occur, particularly with modern powered vehicles with monocoque bodywork. This is because of unsuitable inclined positions of the strut made necessary by this type of body for the different heights of the vehicle at the beginning of lifting.

OBJECT OF THE INVENTION

The object of the invention is to provide a shearslike lifting jack of the kind mentioned which, while maintaining a simplicity of structure for its lifting shears, can lift powered vehicles, in particular those with rounded bodies in a manner free from slipping, wherein the load take-up point or points of the jack even at different height positions at the beginning of lifting lie as much as possible perpendicularly over the load-producing point, and no difficulties are present on installing the jack or the leg at the requisite inclined position.

SUMMARY OF THE INVENTION

This object is achieved in that the foot member is constructed as a hinge-free roller foot arranged on the leg, which has an extended locating surface in addition to its contact or load-bearing surface.

BRIEF DESCRIPTION OF THE DRAWING

In the following description, embodiments of the invention are described in which further details of the invention will be given. In the accompanying drawing:

FIG. 9a shows a section taken along line A-B of FIG. 9;

FIGS. 10 and 11 show the installation of the threaded spindle nut at the upper end of the leg in two different embodiments; and FIGS. 11a and 11b show different positions for the threaded nut at the upper end of the leg directly after installation and in the operative position in the embodiment shown according to FIG. 11.

SPECIFIC DESCRIPTION

Figures 1, 2, 3:
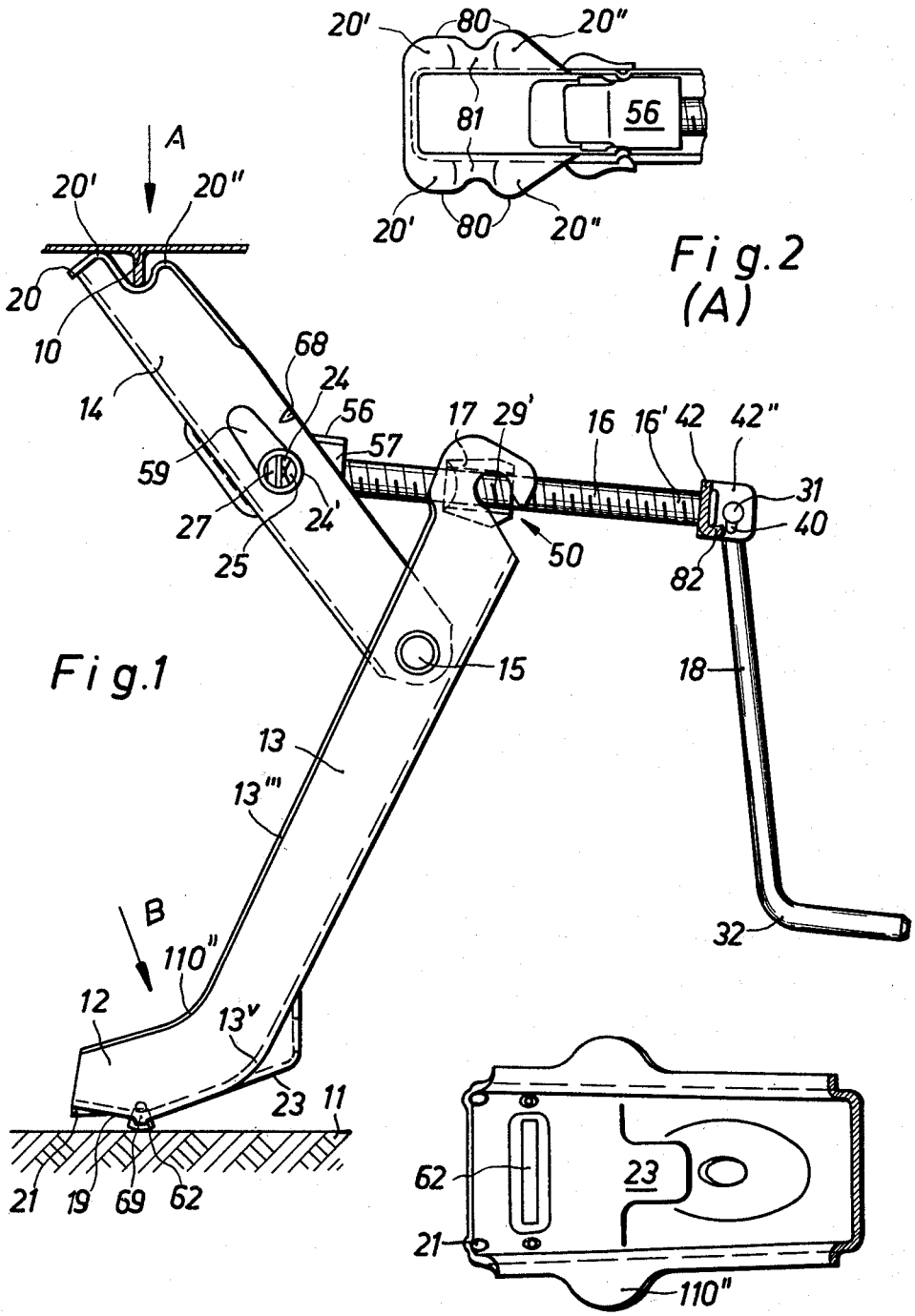
FIG. 1 shows a side view of a first embodiment of a vehicle lifting jack in a lifting position.
FIG. 2 shows a plan view of the load-carrying head taken in the direction of arrow A in FIG. 1.
FIG. 3 shows a plan view of the foot member taken in the direction of arrow B in FIG. 1.

The shears-like vehicle-lifting jack illustrated in FIG. 1 lifts a vehicle, indicated by a weld seam 10, and supports itself on the ground 11 with a supporting foot member 12. The jack has a leg 13 constructed in one piece with the foot 12, which leg 13 is hingedly connected to a carrier arm 14 by means of a pivot pin 15. The arm 14 is connected with the upper end of the leg 13 by means of a threaded spindle 16, which is rotationally and pivotally, but axially-immovably, carried on the arm 14, whereas it is connected to the leg 13 by a pivotable threaded nut 17. At its free end 16', a crank arm 18 engages the threaded spindle 16, with which the threaded spindle can be axially adjusted by rotation in the threaded nut 17 so that the arm 14 is moved about the pivot axis 15.

The arm 14 has a load head 20 which is formed directly on the free end of the arm, for engaging the underside of the vehicle. According to the lifting position of the jack, the support surfaces 20'' and/or the support surface 20' rest against the vehicle chassis, so that a rolling effect takes place during lifting. FIG. 2 shows four supporting fingers 80 on the support-plate-free load head 20. Since the carrier arm 14 is of U-shape in profile, each two support fingers 80 are formed on one limb of the U-shape of the arm 14. Between two supporting fingers 80 of one limb of the U on each side, a free space 81 is present to receive the weld seam 10.

Figure 4:
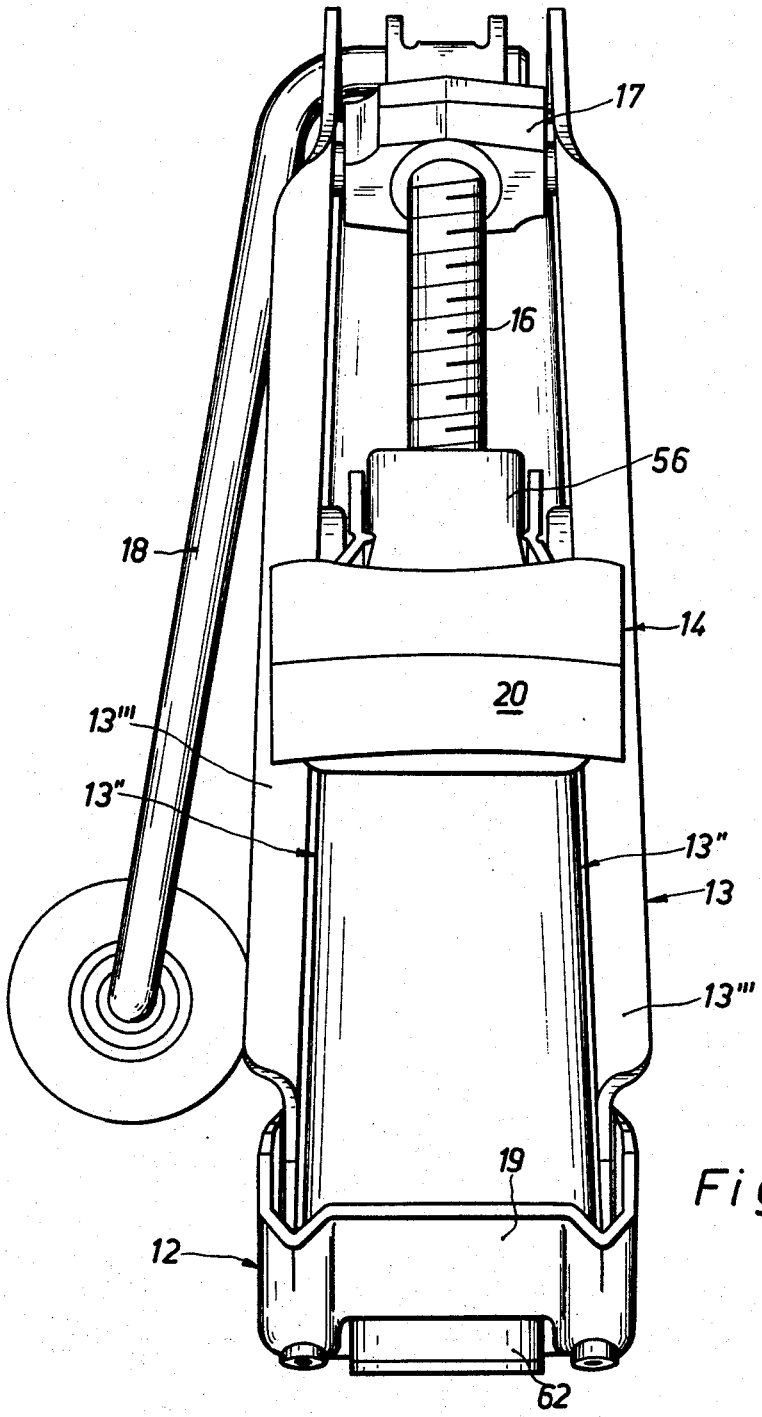
FIG. 4 shows a front view of a second form of jack in the ready-for-use condition.
Figures 5, 5A, 5B, 6, 6A, 7, 8, 8A:
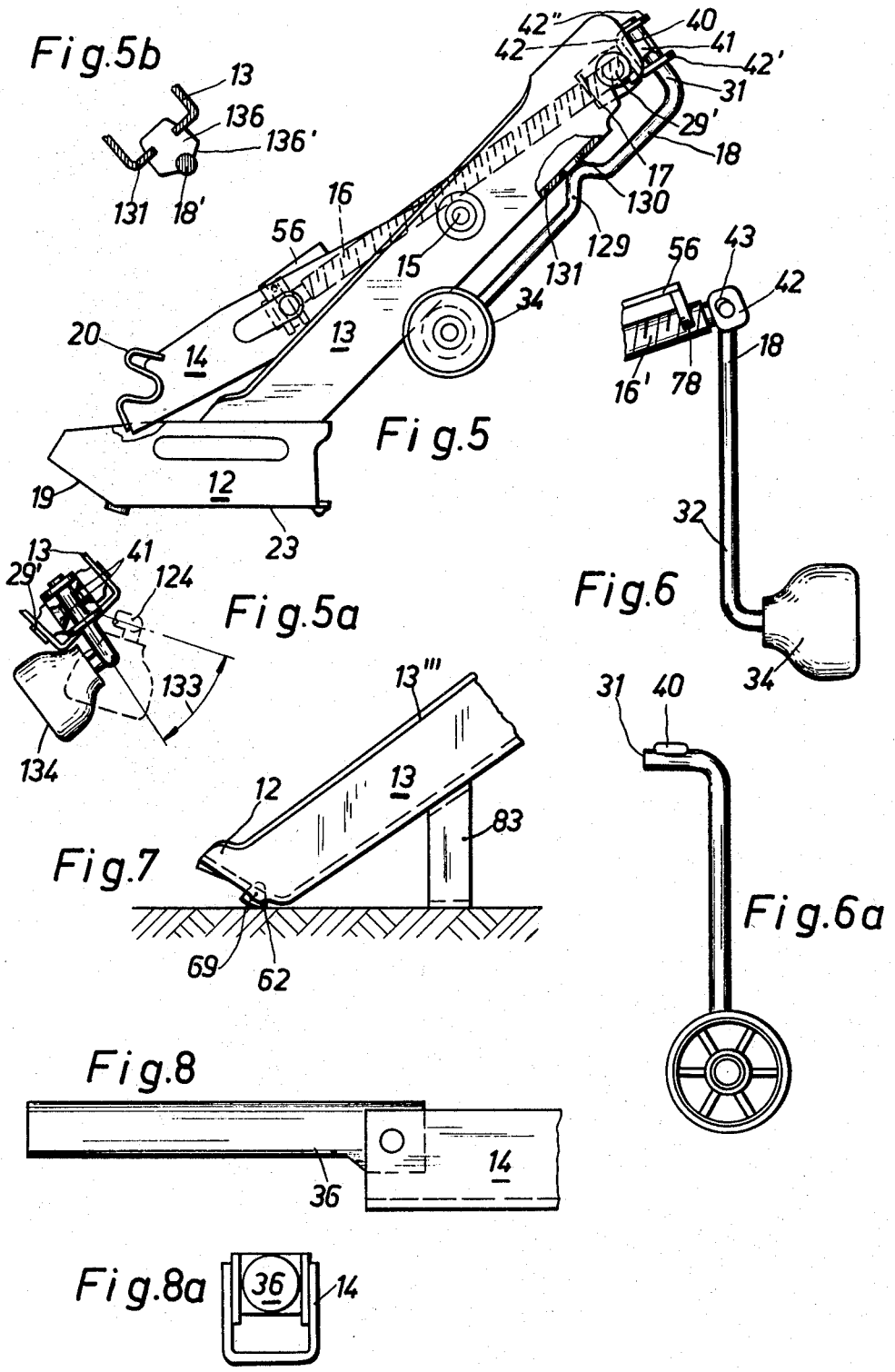
FIG. 5 shows a side view of a jack similar to that of FIG. 4 but with the carrier arm lowered.
FIG. 5a shows a plan view of the upper end of the jack according to FIG. 5.
FIG. 5b shows a cross-section through the upper part of the leg of the jack of FIG. 5 with a variant.
FIGS. 6 and 6a show the construction of the hand crank and its linkage to the end of the threaded spindle.
FIG. 7 shows the lower end of a leg with a rigidly-mounted contact or locating foot.
FIGS. 8 and 8a show the special construction of a load head for the carrier arm.

FIGS. 4, 5 show a load head 20 formed by a bearing plate on the free end of the carrier arm 14. This is deepended in channel fashion corresponding to the weld seam running in the longitudinal direction of the vehicle and it supports itself against the vehicle chassis with its side edges on the right and the left of the center of the channel, when the vehicle is being raised by the jack. According to FIG. 8, an insertable bar or pin 36 is provided on the free end of the arm 14 and can be inserted into a support hole (not shown) on the underside of the vehicle, so that the carrier arm itself remains substantially free from bending moments.

The carrier arm 14 is U-shaped in profile, as shown in FIGS. 4, 8a. Approximately in the middle of the carrier arm, two holes 24 are provided in its side limbs or webs, which receive the journal pins 25 of a counter bearing ring 26. The threaded spindle 16 is supported on this bearing ring 26, as shown in FIG. 9b with, for example, a forged or other enlarged head 64 by way of a bearing plate 27 and ball bearings 28 held in a spider cage 28'. The neck 65 of the threaded spindle 16 has a substantially smaller diameter than the apertures in the counter bearing ring 26 and the spider cage 28'. Moreover, the bearing ring 26 has a dished inwardly-widened bearing race 61, so that the threaded spindle can undergo low-friction tilting movements over the extent represented by the arrows. In contrast to FIG. 9b, it is possible to widen out the other bearing race 61', i.e. in the bearing plate 27, radially outwardly in order to provide for tilting movements of the threaded spindle.

In order to be able readily to install the roller bearing for the carrier arm mounting 58 of the threaded spindle in the arm 14 after its manufacture, one of the holes 24 is formed, in a manner not shown in detail, as a longitudinal slot or a lead-in notch 59 for a journal pin 25 which merges into the hole is provided on at least one of the holes. The notch 59 is formed in one operation, together with the outwardly-directed reinforcing rim 24', an outward projection 67 and a holding notch 68, as well as the load head according to FIG. 2, from a correspondingly pre-formed stamping blank.

Figure 9:
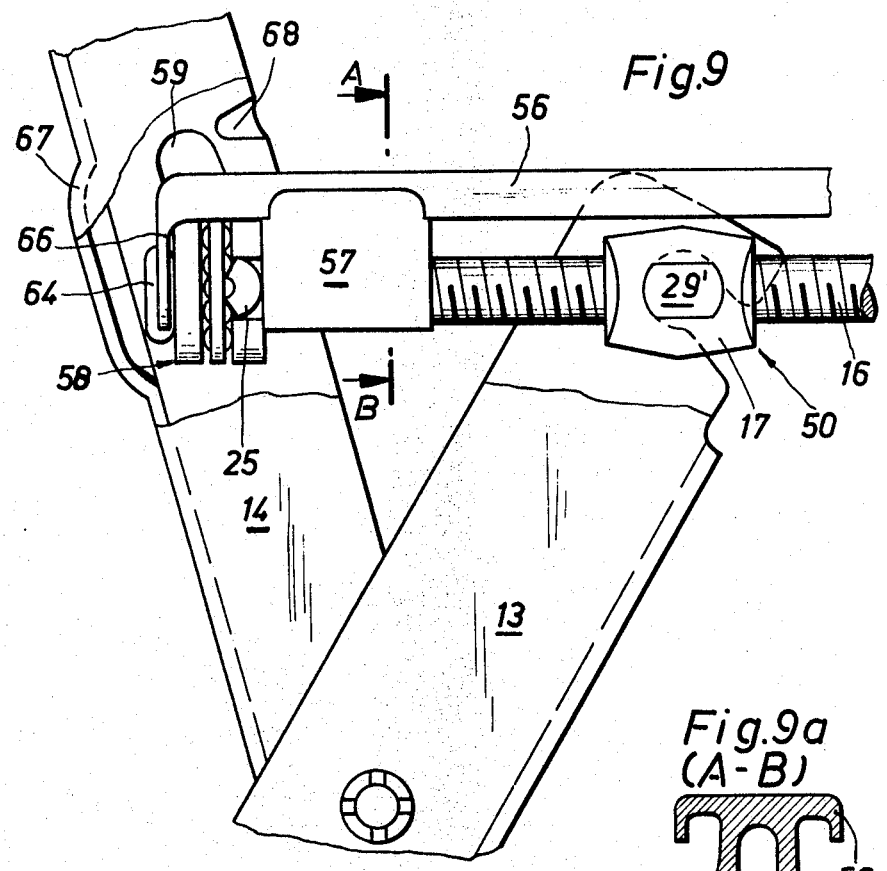
FIG. 9 shows an enlarged partly broken-away side view of a jack in the region of the hinge joint connections of the threaded spindle to the carrier arm and the leg.
Figure 9B:
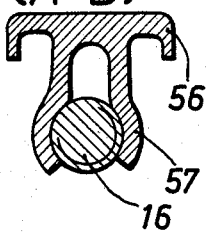
FIG. 9b shows an enlarged representation of a special threaded spindle bearing on the carrier arm.
Figure 9B:
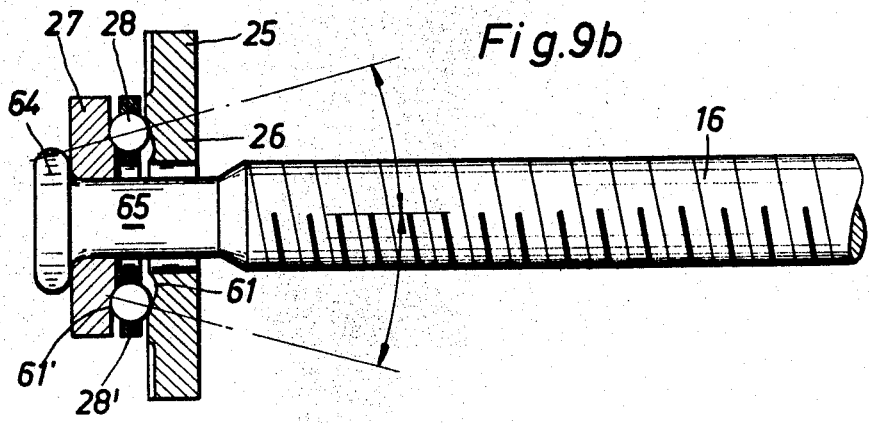

The roller bearing of the carrier arm support 58 is surrounded by a removable cover 56 which is snap-fitted on the threaded spindle 16 by means of two clamping members 57, as shown in FIG. 9a. FIG. 9 shows that the carrier arm end 66 of the cover 56 surrounds the head 64 of the threaded spindle 16 or engages fully around it in a manner not shown in detail. The damping members 57 are also formed as spacers or distance pieces for the threaded nut 17, so that the closest possible location of the carrier arm 14 to the leg 13 is thereby determined. The holding notches 68 prevent the cover from being pressed off upwardly. The cover 56 is either made short, as shown in FIG. 1, or it extends as shown in FIGS. 9, 6 beyond the threaded nut 17 and over the whole of the threaded spindle 16 and is supported at its end by means of a clamp 78 on the spindle end 16'.

The spindle nut 17 is carried upon the threaded spindle 16 and has two outwardly-directed pins 29' which pivotably journal the threaded nut 17 in slots 50 in the side limbs of the U-shaped profiled leg 13. Each pin 29' is provided, according to FIG. 10, with two flat surfaces 51, so that it can be guided through a narrower slot opening 53 in the main recess 53'. This ensures, in cooperation with the threaded spindle 16, that the flattened pins cannot spring out of the narrow slot openings, as the extreme positions of the threaded nut shown in FIGS. 1 and 5.

FIG. 11 shows a threaded nut 17 whose pins 29'' have V-shaped apertures 52 which fit around hooks 55 located adjacent the slot openings 54, so that the pin can be pivoted into the recesses 53', as shown in FIGS. 11, 11a. In this way, the threaded nut 17 is brought from its uppermost pivoted position to its lowermost pivoted position and is held in position in cooperation with the threaded spindle 16. No deformation of the leg is necessary after location of the threaded nut 17.

The spindle end 16' is connected with the end 31 of the crank arm 18 by a U-shaped profiled hinge member 42, e.g. by an upsetting operation. The crank end 31 has an abutment nose 40 as shown in FIG. 6a, which passes through an appropriate opening 43 in the U-shaped side limb 42'', as illustrated in FIG. 6. FIGS. 5 and 5a show two abutment lugs 41 between which the nosepiece 40 can be moved so that the crank arm 18 is correspondingly movable. The lugs prevent the nosepiece 40 coming into the region of the opening 43 and allow the crank arm 18 to tilt only so that it can be moved between a rest position and an actuating position and not into the extended position of the threaded spindle. FIG. 1 shows the construction of a link member 42 with only one abutment lug 82, wherein the nosepiece 40 is so arranged that the end of the crank is supportable under its own weight on the link member 42, in its actuating position, in the way illustrated. The free end 32 of the crank is provided with a rotatable handle 34 as shown in FIG. 6.

The leg 13 is of U-shaped profile as shown in FIGS. 3, 4 and 5a. Its side limbs 13'' run in the direction of the support foot 12 with a progressively increasing mutual spacing. This shape prevents outward bending of the side limbs, which are provided with outwardly; angled rim members 13''' and makes for better use of the material. This also ensures that the threaded nut 17 cannot move out of the allowed region above the bearing point of the support foot 12 on the ground 11, even when the jack is inclined to the side, as a result of lifting of the vehicle. FIG. 3 shows that the leg has outwardly-directed lugs 110'' in the region of its connection with the support foot 12, which serve to give stiffening. In particular, they allow use of a straight edged shape of blank, from which the leg and the support foot can be manufactured e.g. by deep drawing. This also ensures that the side limbs or edges do not suffer damage during formation.

The foot member 12 has a contact surface 23 and a locating surface 19 and is provided with projections 21 on the free end of the standing surface for increasing its security of location. For further increase on safety, particularly on installation on smooth ground, a non-slip rib 62 is provided between the locating surface 19 and the contact surface 23 in the region of the rolling edge 69. It is made from an extruded profiled bar and consists of a material with a high coefficient of friction, e.g. rubber. It extends over substantially the whole width of the supporting foot between the projections 69 and the roller edge. In order to enlarge the contact surface 23, an outward projection of the U-shaped member 13V is provided in the region of the connection of the leg 13 to the support foot 12. As shown in FIG. 5, however, the support foot 12 is secured directly to the leg 13, e.g. by welding. In both cases, the contact surfaces 23 are twice as long as the locating surface 19. A considerable enlargement of the effective contact surface is achieved by the supporting projection or strut 83 provided on the leg 13, as shown in FIG. 7. Also, the jack can be contructed without the curvature in the region of the connection of the leg to the support foot illustrated in FIG. 1, so that the amount of material and manufacturing expense is reduced, while the same stability is given.

The hinged or movably-connected parts of the jack are mass-production parts and have relatively large tolerances in the region of their pivoting and moving points, for cost-saving anad manufacturing reasons. The jack therefore tends to rattle when it is carried in a vehicle in an unloaded condition. In order to make the jack rattle-free, the crank arm 18 is stressed transversely to the leg, with the carrier arm pivoted downwardly against the leg, a bending force being applied to the threaded spindle. As shown in FIG. 5, the crank arm 18 has a kink 129 which is engaged in an aperture or recess 130 formed in the base 131 of the leg 13. This position of the crank arm can only be attained in that the crank arm according to FIG. 5a is pivoted from the position 124 shown in dotted lines to a fully drawn out position 134 corresponding to the curved path indicated by the arrow 133. Since the crank arm 18 runs essentially parallel to the threaded spindle 16, but the leg with which the crank arm is stressed on the other hand includes an angle with the threaded spindle 16, on pivoting the crank arm a toggle-lever-like resistance must be overcome before the crank arm reaches the position 134 shown in FIG. 5. In this position, not only is the spindle 16 drawn up corresponding to the pitch of its thread and is thus axially stressed, but it is also stressed via the crank end 31, so that it urges the arm 14 downwardly. Consequently, the carrier arm lies inside the U-shaped limbs of the support foot 12 so that rattling is not possible. The stressing of the threaded spindle 16 also prevents rattling at the connection point between the hinge member 42 and the crank end 31. The handle 34 lies against the leg 13. FIG. 5b shows in section a straight crank arm 18, which is held in place by the leg member 13, by means of a spacer member 136 provided with sloping "walk-on" surfaces 136' and constructed as a rubber buffer. The spacer member 136 is press-fitted into the base 131 of the leg. It is possible to dispense with the member 136 and to shape the base 131 so that a rest position is provided for a shaped or unshaped crank arm 18. Apart from the details shown, stressing of the crank arm is also possible against an outwardly-lying side surface of the side limb of the leg, since stressing is also possible, particularly against bending with the threaded spindle 16, which stresses all the hinge positions of the jack.

What we claim is:

1. A vehicle jack comprising:

a leg formed with a straight shank having an upper end, a foot angled from and formed on a lower end of said [shanks] *shank*, a nonslip rib on the underside of said foot extending substantially over the entire width thereof, said foot having an extended locating surface extending forwardly of said rib and provided with projections, and a contact surface rearwardly of said rib *and rigid with said foot*, the upper end of said leg being formed with a notch *and being free from any ground-engaging support between said foot and said notch, said contact surface being at least twice as long as said locating surface;* an elongated carrier arm having one end pivotally connected to said shank and another end [another end] formed with a vehicle-engaging head;

a nut pivotally mounted in said notch at said upper end of said leg;

a [thread] *threaded* elongated spindle received in said nut at an intermediate portion along its length;

a thrust bearing pivotally mounted on said arm at an intermediate location between the ends thereof and engaging one end of said spindle; and a crank on the other end of said spindle for rotating same to thread said spindle along said nut and raise and lower said head *said nut being formed with a pair of oppositely extending journal pins, said leg being of U-cross section having side limbs formed with slots constituting said notch, said pins being received in said slots, said thrust bearing comprising a roller bearing and a counterbearing ring, receiving said roller bearing, said arm being of U-cross section and having side limbs formed with slots receiving pins of said counterbearing ring.*

2. The jack defined in claim 1, further comprising hinge means swingably mounting said crank arm on said other end of said spindle.

3. The jack defined in claim 1 in which said arm, said leg and said foot are each of U-cross section with each U having side limbs, the side limbs of said leg spreading apart in the direction of said foot.

[4. The jack defined in claim 3 wherein said locating surface is at least twice as long as said contact surface.]

5. The jack defined in claim 1 wherein said head is provided with means for rollingly engaging said vehicle.

[6. The jack defined in claim 5 wherein said other end and said head have mutually contacting complementarily shaped surfaces.]

[7. The jack defined in claim 1 wherein said nut is formed with a pair of oppositely extending journal pins, said leg being of U-cross section having side limbs formed with slots constituting said notch, said pins being received in said slots.]

[8. The jack defined in claim 7 wherein said thrust bearing comprises a roller bearing, a counterbearing ring receiving said roller bearing and provided with a pair of U-cross section and having side limbs formed with slots receiving the pins of said counterbearing ring.]

9. The jack defined in claim [8] *1*, further comprising a removable cover clamped on said spindle between said arm and said leg.

10. The jack defined in claim 9 wherein said rib has a higher coefficient of friction than said foot.

* * * * *